US012802661B2

(12) United States Patent
Yoon et al.

(10) Patent No.: US 12,802,661 B2
(45) Date of Patent: Nov. 17, 2026

(54) DISPLAY APPARATUS AND CONTROL METHOD THEREOF

(71) Applicant: SAMSUNG ELECTRONICS CO., LTD., Suwon-si (KR)

(72) Inventors: Kyoungsik Yoon, Suwon-si (KR); Minsun Yang, Suwon-si (KR); Chiwoo Lee, Suwon-si (KR); Yeongchan Bae, Suwon-si (KR); Gaewon Seo, Suwon-si (KR); Youngsun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/271,306

(22) Filed: Jul. 16, 2025

(65) Prior Publication Data

US 2025/0391388 A1 Dec. 25, 2025

Related U.S. Application Data

(63) Continuation of application No. PCT/KR2025/008091, filed on Jun. 12, 2025.

(30) Foreign Application Priority Data

Jun. 24, 2024 (KR) ........................ 10-2024-0081897

(51) Int. Cl.
*G09G 5/00* (2006.01)
*G06F 3/147* (2006.01)
(Continued)

(52) U.S. Cl.
CPC ............. *G09G 5/006* (2013.01); *G06F 3/147* (2013.01); *H01Q 1/2258* (2013.01); *H01Q 1/24* (2013.01); *G09G 2370/16* (2013.01)

(58) Field of Classification Search
CPC .... G09G 5/006; G09G 2370/16; G06F 3/147; H01Q 1/2258; H01Q 1/24
(Continued)

(56) References Cited

U.S. PATENT DOCUMENTS 8,571,129 B2 10/2013 Han
9,258,023 B2 2/2016 Kim
(Continued)

FOREIGN PATENT DOCUMENTS

CN 108270088 A 7/2018
KR 10-0763812 B1 10/2007
(Continued)

OTHER PUBLICATIONS

International Search Report (PCT/ISA/210) and Written Opinion (PCT/ISA/237) issued on Sep. 15, 2025 by the International Searching Authority in International Patent Application No. PCT/KR2025/008091.

*Primary Examiner* — Mark Edwards
(74) *Attorney, Agent, or Firm* — Sughrue Mion, PLLC

(57) ABSTRACT

A display apparatus includes: a first antenna unit configured to perform wireless communication with an external device; a first radio-frequency (RF) circuit configured to transmit and receive signals through the first antenna unit; a second antenna unit configured to perform wireless communication with a set-top box; a second RF circuit configured to transmit and receive signals through the second antenna unit; a first switch configured to selectively connect the first antenna unit to the first RF circuit and to the second RF circuit; a memory storing instructions; and at least one processor configured to execute the instructions to: identify a quality of signals received through the second antenna unit, and based on the quality of signals received through the second antenna unit being less than or equal to a predeter-
(Continued)

mined reference value, control the first switch to connect the first antenna unit to the second RF circuit.

19 Claims, 13 Drawing Sheets

(51) Int. Cl.
*H01Q 1/22* (2006.01)
*H01Q 1/24* (2006.01)
(58) Field of Classification Search
USPC .......................................................... 345/30
See application file for complete search history.

(56) References Cited

U.S. PATENT DOCUMENTS

| | | | |
|---|---|---|---|
| 10,129,165 | B2 | 11/2018 | Di Nallo et al. |
| 10,374,674 | B2 | 8/2019 | Lee et al. |
| 10,397,764 | B2 | 8/2019 | Park et al. |
| 10,998,986 | B2 | 5/2021 | Seong et al. |
| 11,177,861 | B2 | 11/2021 | Hong et al. |
| 11,553,249 | B1 | 1/2023 | Lee |
| 2014/0105204 | A1 | 4/2014 | Bengtsson |

FOREIGN PATENT DOCUMENTS

| | | | | | |
|---|---|---|---|---|---|
| KR | 10-2011-0069638 | A | | 6/2011 | |
| KR | 20110069638 | A | * | 6/2011 | ............. H04B 17/23 |
| KR | 10-2011-0113912 | A | | 10/2011 | |
| KR | 10-2017-0141016 | A | | 12/2017 | |
| KR | 10-2018-0081289 | A | | 7/2018 | |
| KR | 10-2018-0099538 | A | | 9/2018 | |
| KR | 10-2019-0012675 | A | | 2/2019 | |
| KR | 10-2019-0120639 | A | | 10/2019 | |
| KR | 10-2022-0122074 | A | | 9/2022 | |
| KR | 20220122074 | A | * | 9/2022 | ............... H01Q 1/46 |
| KR | 10-2023-0001154 | A | | 1/2023 | |

* cited by examiner

DISPLAY APPARATUS AND CONTROL METHOD THEREOF

CROSS-REFERENCE TO RELATED APPLICATION(S)

This application is a bypass continuation of International Application No. PCT/KR2025/008091, filed on Jun. 12, 2025, which is based on and claims priority to Korean Patent Application No. 10-2024-0081897, filed on Jun. 24, 2024, in the Korean Intellectual Property Office, the disclosures of which are incorporated by reference herein in their entireties.

BACKGROUND

1. Field

The disclosure relates to a display apparatus and a control method thereof, and more particularly, to a display apparatus that can secure high signal quality when connecting via wireless communication between the display apparatus and a set-top box or an external device, and a control method thereof.

2. Description of Related Art

In order to display an image in a display apparatus, image data may be transmitted to the display apparatus via a wired connection using interfaces such as, for example, and without limitation, HDMI, USB, wired cable, and the like. However, a method of transmitting image data to the display apparatus using a wired connection may not be well-received by users from an esthetic aspect or a convenience aspect.

Accordingly, a method of transmitting image data wirelessly to the display apparatus through a set-top box is being more increasingly employed.

Meanwhile, when connecting the display apparatus with the set-top box and external device wirelessly, a minimum throughput is required to transmit image data. However, if signals between the display apparatus and the set-top box or the external device do not satisfy the minimum throughput due to various external factors, the display apparatus may face difficulty of not being able to smoothly receive image data from the set-top box or the external device.

SUMMARY

Aspects will be set forth in part in the description which follows and, in part, will be apparent from the description, or may be learned by practice of the presented embodiments.

According to an aspect of the disclosure, a display apparatus may include: a first antenna unit configured to perform wireless communication with an external device; a first radio-frequency (RF) circuit configured to transmit and receive signals through the first antenna unit; a second antenna unit configured to perform wireless communication with a set-top box; a second RF circuit configured to transmit and receive signals through the second antenna unit; a first switch configured to selectively connect the first antenna unit to the first RF circuit and to the second RF circuit; a memory storing instructions; and at least one processor configured to execute the instructions to: identify a quality of signals received through the second antenna unit, and based on the first RF circuit being in a standby state and the quality of signals received through the second antenna unit being less than or equal to a predetermined reference value, control the first switch to connect the first antenna unit to the second RF circuit to perform wireless communication with the set-top box.

The display apparatus may further include: a first matching circuit between the first switch and the second RF circuit, the first matching circuit being configured to control an impedance of the first antenna unit to correspond with a frequency of signals received from the set-top box.

The display apparatus may further include: a second switch between the first matching circuit and the second RF circuit, the second switch being configured to selectively connect wiring from the first antenna unit to the second RF circuit, where the at least one processor is further configured to execute the instructions to: based on the first antenna unit being connected to the first RF circuit, control the second switch to disconnect the wiring from the first antenna unit to the second RF circuit.

The display apparatus may further include: an interface configured to receive a user input for performing wireless communication with the set-top box, where the at least one processor is further configured to execute the instructions to: based on the quality of signals received through the second antenna unit being less than or equal to the predetermined reference value and the user input being received through the interface, convert the first RF circuit to the standby state, and control the first switch to connect the first antenna unit to the second RF circuit to perform wireless communication with the set-top box.

The display apparatus may further include: a third switch configured to selectively connect the second antenna unit to the first RF circuit and to the second RF circuit, where the at least one processor is further configured to execute the instructions to: identify a quality of signals received through the first antenna unit, and based on the second RF circuit being in the standby state and the quality of signals received through the first antenna unit being less than or equal to a second reference value, control the third switch to connect the second antenna unit to the first RF circuit to perform wireless communication with the external device.

The display apparatus may further include: a second matching circuit between the third switch and the first RF circuit, the second matching circuit being configured to control an impedance of the second antenna unit to correspond with a frequency of signals received from the external device.

The display apparatus may further include: a fourth switch between the second matching circuit and the first RF circuit, the fourth switch being configured to selectively connect wiring from the second antenna unit to the first RF circuit, where the at least one processor is further configured to execute the instructions to: based on the second antenna unit being connected to the second RF circuit, control the fourth switch to disconnect the wiring from the second antenna unit to the first RF circuit.

The display apparatus may further include: an interface configured to receive a user input for performing wireless communication with the external device, where the at least one processor is further configured to execute the instructions to: based on the quality of signals received through the first antenna unit being less than or equal to the second reference value and the user input being received through the interface, convert the second RF circuit to the standby state, and control the third switch to connect the second antenna unit to the first RF circuit to perform wireless communication with the external device.

According to an aspect of the disclosure, a control method of a display apparatus including a first radio-frequency (RF) circuit configured to perform wireless communication with an external device through a first antenna unit and a second RF circuit configured to perform wireless communication with a set-top box through a second antenna unit, the method may include: identifying a quality of signals received through the second antenna unit; identifying whether the first RF circuit is in a standby state or not in the standby state; and based on the first RF module being in the standby state and the quality of signals received through the second antenna unit being less than or equal to a predetermined reference value, connecting the first antenna unit to the second RF circuit to perform wireless communication with the set-top box.

The connecting the first antenna unit to the second RF circuit may include: controlling an impedance of the first antenna unit to correspond with a frequency of signals received from the set-top box.

The method may further include: receiving a user input for performing wireless communication with the set-top box, where the connecting the first antenna unit to the second RF circuit includes: based on the first RF circuit being in an operating state and the quality of signals received through the second antenna unit being less than or equal to the reference value, converting the first RF circuit to the standby state, and connecting the first antenna unit to the second RF circuit to perform wireless communication with the set-top box.

The method may further include: identifying a quality of signals received through the first antenna unit; identifying whether the second RF circuit is in the standby state or not in the standby state; and based on the second RF circuit being in the standby state and the quality of signals received through the first antenna unit being less than or equal to a second reference value, connecting the second antenna unit to the first RF circuit to perform wireless communication with the external device.

The connecting the second antenna unit to the first RF circuit may include: controlling an impedance of the second antenna unit to correspond with a frequency of signals received from the external device.

The method may further include: receiving a user input for performing wireless communication with the external device, where the connecting the second antenna unit to the first RF circuit includes: based on the second RF circuit being in an operating state and the quality of signals received through the first antenna unit being less than or equal to the second reference value, converting the second RF circuit to the standby state, and connecting the second antenna unit to the first RF circuit to perform wireless communication with the external device.

According to an aspect of the disclosure, a non-transitory computer-readable recording medium may store a program for executing a control method of a display apparatus including a first radio-frequency (RF) circuit configured to perform wireless communication with an external device through a first antenna unit and a second RF circuit configured to perform wireless communication with a set-top box through a second antenna unit, the method may include: identifying a quality of signals received through the second antenna unit; identifying whether the first RF circuit is in a standby state or not in the standby state; and based on the first RF circuit being in the standby state and the quality of signals received through the second antenna unit being less than or equal to a predetermined reference value, connecting the first antenna unit to the second RF circuit to perform wireless communication with the set-top box.

According to an aspect of the disclosure, a display apparatus may include: a first antenna unit configured to perform wireless communication with an external device; a first radio-frequency (RF) circuit configured to transmit and receive signals through the first antenna unit; a second antenna unit configured to perform wireless communication with a set-top box; a second RF circuit configured to transmit and receive signals through the second antenna unit; a third switch configured to selectively connect the second antenna unit to the first RF circuit and to the second RF circuit; a memory storing instructions; and at least one processor configured to execute the instructions to: identify a quality of signals received through the first antenna unit, and based on the second RF circuit being in the standby state and the quality of signals received through the first antenna unit being less than or equal to a second reference value, control the third switch to connect the second antenna unit to the first RF circuit to perform wireless communication with the external device.

The display apparatus may further include: a second matching circuit between the third switch and the first RF circuit, the second matching circuit being configured to control an impedance of the second antenna unit to correspond with a frequency of signals received from the external device.

The display apparatus may further include: a fourth switch between the second matching circuit and the first RF circuit, the fourth switch being configured to selectively connect wiring from the second antenna unit to the first RF circuit, where the at least one processor is further configured to execute the instructions to: based on the second antenna unit being connected to the second RF circuit, control the fourth switch to disconnect the wiring from the second antenna unit to the first RF circuit.

The display apparatus may further include: an interface configured to receive a user input for performing wireless communication with the external device, where the at least one processor is further configured to execute the instructions to: based on the quality of signals received through the first antenna unit being less than or equal to the second reference value and the user input being received through the interface, convert the second RF circuit to the standby state, and control the third switch to connect the second antenna unit to the first RF circuit to perform wireless communication with the external device.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
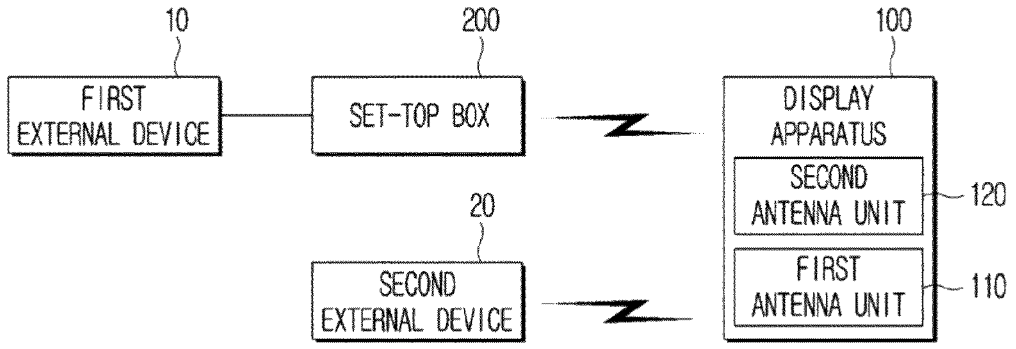
FIG. 1 is a block diagram illustrating a configuration of a wireless communication system according to various embodiments of the disclosure.

Terms used in the disclosure will be briefly described, and the disclosure will be described in detail.

The terms used in describing embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the relevant description. Accordingly, the terms used herein are not to be understood simply as its designation but based on the meaning of the term and the overall context of the disclosure.

In the disclosure, expressions such as "have", "may have", "include", "may include", "comprise", "may comprise", and the like are used to designate a presence of a corresponding characteristic (e.g., elements such as numerical value, function, operation, or component), and not to preclude a presence or a possibility of additional characteristics.

In the disclosure, expressions such as "A or B", "at least one of A and/or B", or "one or more of A and/or B" may include all possible combinations of the items listed together. For example, "A or B", "at least one of A and B", or "at least one of A or B" may refer to all cases including (1) at least one A, (2) at least one B, or (3) both of at least one A and at least one B.

Expressions such as "1st", "2nd", "first", or "second" used in the disclosure may limit various elements regardless of order and/or importance, and may be used merely to distinguish one element from another element and not limit the relevant element.

When a certain element (e.g., a first element) is indicated as being "(operatively or communicatively) coupled with/to" or "connected to" another element (e.g., a second element), it may be understood as the certain element being directly coupled with/to the another element or as being coupled through other element (e.g., a third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used herein perform at least one function or operation, and may be implemented with a hardware or software, or implemented with a combination of hardware and software. In addition, a plurality of "modules" or a plurality of "parts", except for a "module" or a "part" which needs to be implemented with a specific hardware, may be integrated in at least one module and implemented as at least one processor (not shown).

An embodiment of the disclosure will be described in greater detail below with reference to the accompanied drawings.

FIG. 1 is a block diagram illustrating a configuration of a wireless communication system according to various embodiments of the disclosure.

Referring to FIG. 1, the wireless communication system may include a display apparatus 100, a set-top box 200, a first external device 10 connected to the set-top box 200, and a second external device 20 connected to the display apparatus 100. At this time, the display apparatus 100 may be an apparatus that displays image content, and may be a television (TV), a desktop personal computer (PC), a notebook, a video wall, a large format display (LFD), a digital signage, a digital information display (DID), a projector display, a digital video disk (DVD) player, a smartphone, a tablet PC, a monitor, a pair of smart glasses, a smart watch, and the like. The display apparatus 100 may be any apparatus that can display an input image. The above is merely one embodiment, and is not limited thereto. The display apparatus 100 may be implemented as electronic apparatuses of various types.

In addition, the set-top box 200 may be connected to the display apparatus 100 and may refer to all devices that transmit signals input from the first external device 10 to the display apparatus 100. The set-top box 200 may be referred to as an image providing device, and may be referred to as a set-top unit, a STB, a STU, and the like in addition to the set-top box 200. In addition, the set-top box 200 may be implemented with an OC box, a DVD player, and the like.

The display apparatus 100 may transmit and receive signals with the second external device 20 using a first antenna unit 110. In this case, the second external device 20 may include an external access point (AP). The display apparatus 100 may receive image data from the second external device 20 using a wireless network. The wireless network may include at least one from among a long term evolution (LTE), an LTE advance (LTE-A), a code division multiple access (CDMA), a wideband CDMA (WCDMA), a universal mobile telecommunications system (UMTS), a wireless broadband (WiBro), or a global system for mobile communications (GSM), wireless fidelity (WiFi), light fidelity (LiFi), Bluetooth, Bluetooth low energy (BLE), ZigBee, a near field communication (NFC), a magnetic secure transmission, a radio frequency (RF), or a body area network (BAN).

For example, if the wireless communication system uses WIFI, the display apparatus 100 may be connected in a WIFI Station (STA) mode to the external access point (AP) and receive image data from the AP.

The set-top box 200 may be wiredly connected or wirelessly connected with the first external device 10, and transmit and receive signals with the display apparatus 100 through a second antenna unit 120 provided in the display apparatus 100. For example, the set-top box 200 may receive image data from the first external device 10 and transmit to the display apparatus 100.

The display apparatus 100 may receive image data from the second external device 20 using the wireless network, or receive image data wirelessly from the set-top box 200 connected to the first external device 10 and display the image data. For example, the display apparatus 100 may receive image data from the second external device 20 using WIFI7, or receive image data from the set-top box 200.

The WIFI7 may use a 4K Quadrature Amplitude Modulation (QAM) which is a high-performance modulation coding scheme (MCS) to secure a high data throughput compared to existing WIFI. The WIFI7 may apply a wide bandwidth of 320 MHz, and provide higher WIFI speed, more stable WIFI, and shorter delay time compared to WIFI6 by applying a multi link operation (MLO). In addition, the WIFI7 may increase efficiency of an orthogonal frequency division multiple access (OFDMA) based on multi-resource unit (MRU) technology. Specifically, the WIFI7 may provide a very high performance connection speed compared with existing WIFI based on the multi link operation (MLO).

The existing WIFI may transmit and receive signals by connecting to only one band from among a 2.4 GHz or 5 GHz band. However, because the WIFI7 may simultaneously connect 2.4 GHz, 5 GHZ, and 6 GHz bands through the multi link operation (MLO), data throughput may be increased and the delay time may be reduced. The display apparatus 100 may transmit and receive data simultaneously through different frequency bands and channels using the multi link operation (MLO).

Figure 2:
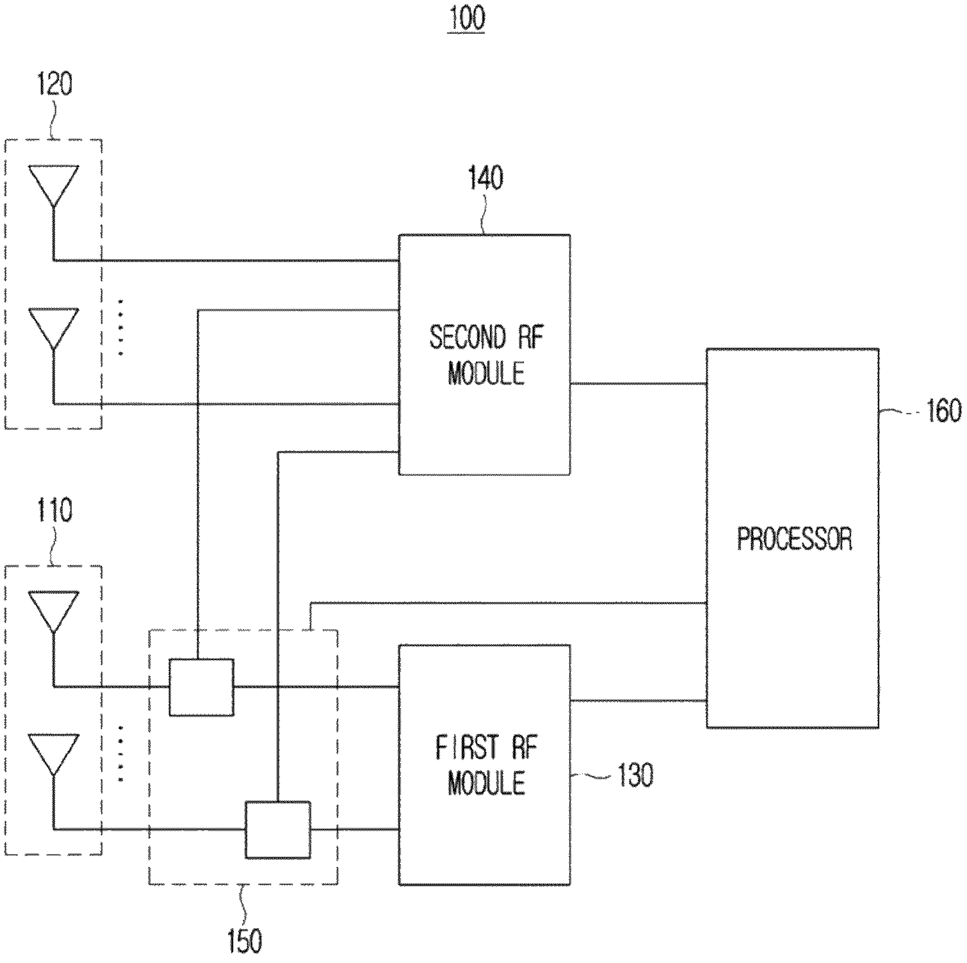
FIG. 2 is a block diagram illustrating a configuration of a display apparatus according to various embodiments of the disclosure.

FIG. 2 is a block diagram illustrating a configuration of a display apparatus according to various embodiments of the disclosure.

Referring to FIG. 2, the display apparatus 100 may include the first antenna unit 110, the second antenna unit 120, a first radio-frequency (RF) module 130, a second RF module 140, a first switching unit 150, and a processor 160. At this time, the first antenna unit 110 may include at least one antenna to perform wireless communication with the second external device 20. For example, if the display apparatus 100 and the second external device 20 are connected wirelessly based on WIFI7, the first antenna unit 110 may include at least one from among an antenna of a 2.4 GHz frequency band, an antenna of a 5 GHz frequency band, and an antenna of a 6 GHz frequency band. However, the above is not limited thereto, and the first antenna unit 110 may include any number of antennas which operate in various frequency bands.

The first RF module 130 may be a configuration for transmitting and receiving signals using the first antenna unit 110. The first RF module 130 may be referred to as a first RF circuit. The first RF module 130 may process the signals received through the first antenna unit 110 and convert to image data, or transmit signals using the first antenna unit 110 to the second external device 20. In this case, the first RF module 130 may include a transceiver, a power amp module (PAM), a frequency filter, a low noise amplifier (LNA), and the like. However, the above is not limited thereto, and the first RF module 130 may include various devices for processing the signals received through the first antenna unit 110, or transmitting the signals using the first antenna unit 110.

The second antenna unit 120 may be a configuration for performing wireless communication with the set-top box 200. The second antenna unit 120 may include at least one antenna for transmitting and receiving signals with the set-top box 200. For example, if the display apparatus 100 and the set-top box 200 are connected wirelessly through WIFI7, the second antenna unit 120 may include at least one from among an antenna of a 2.4 GHz frequency band, an antenna of a 5 GHz frequency band, and an antenna of a 6 GHz frequency band. However, the above is not limited thereto, and the second antenna unit 120 may include any number of antennas which operate in various frequency bands.

The second RF module 140 may be a configuration for transmitting and receiving signals using the second antenna unit 120. The second RF module 140 may be referred to as a second RF circuit. The second RF module 140 may process the signals received through the second antenna unit 120 and convert to image data, or transmit signals to the set-top box 200 using the second antenna unit 120. The second RF module 140 may include a transceiver, a power amp module (PAM), a frequency filter, a low noise amplifier (LNA), and the like. However, the above is not limited thereto, and the second RF module 140 may include various devices for processing signals received through the second antenna unit 120, or transmitting signals using the second antenna unit 120.

The first switching unit 150 may be a configuration for selectively connecting the first antenna unit 110 to the first RF module 130 or the second RF module 140. The first switching unit 150 may include at least one switch disposed between each of the antennas included in the first antenna unit 110 and the first RF module 130 or the second RF module 140. For example, the first switching unit 150 may be configured using a publically-known single pole double throw (SPDT).

The processor 160 may be a configuration for controlling the overall operation of the display apparatus 100 by being connected with each configuration of the display apparatus 100. The processor 160 may be implemented as at least one processor, including one or more of a digital signal processor (DSP), a microprocessor, a graphics processing unit (GPU), an artificial intelligence (AI) processor, a neural processing unit (NPU), and the like. However, the above is not limited thereto, and may include one or more from among a central processing unit (CPU), a micro controller unit (MCU), a micro processing unit (MPU), a controller, an application processor (AP), a communication processor (CP), or an ARM processor, or may be defined by the corresponding term. In addition, the processor 160 may be implemented as a System on Chip (SoC) or a large scale integration (LSI) in which a processing algorithm is embedded, and may be implemented in a form of an application specific integrated circuit (ASIC) or a field programmable gate array (FPGA).

The processor 160 may identify a quality of signals received through the second antenna unit 120. The processor 160 may control, based on the first RF module 130 being in a standby state, and the quality of signals received through the second antenna unit 120 being less than or equal to a predetermined reference value, the first switching unit 150 for the first antenna unit 110 to be connected to the second RF module 140 to perform wireless communication with the set-top box 200. For example, if the first switching unit 150 is implemented as a single pole double throw (SPDT), the processor 160 may release connection between the first antenna unit 110 and the first RF module 130 by controlling the first switching unit 150, and connect the first antenna unit 110 to the second RF module 140.

In this case, the processor 160 may maintain, based on the first RF module 130 being in an operating state, or the quality of signals received through the second antenna unit 120 being greater than or equal to a reference value, a connection state between the first antenna unit 110 and the first RF module 130.

Meanwhile, the processor 160 may identify the quality of signals based on at least one from among a throughput, a received signal strength indicator (received signal strength, RSSI), an SNR, a packet delay, a packet loss, or a jitter of a signal. For example, the processor 160 may control, based on a throughput of signals received through the second antenna unit 120 being less than or equal to a predetermined minimum throughout, the first switching unit 150 for the first antenna unit 110 to be connected to the second RF module 140 to perform wireless communication with the set-top box 200. The processor 160 may control, based on an RSSI of signals received through the second antenna unit 120 being less than or equal to a minimum strength, the first switching unit 150 for the first antenna unit 110 to be connected to the second RF module 140 to perform wireless communication with the set-top box 200. However, the disclosure is described based on the throughput of the signal.

Here, the throughput may indicate an amount of signals transmitted from an external device or a set-top box to an RF module per unit time. The RSSI may indicate a strength of received signals, a strength of received radio signals, or a strength of signals in the RF module. The RSSI may represent the strength of signals in a negative number, and may indicate that the strength of signals is stronger as the number is closer to 0.

The packet delay may indicate time being delayed for signals to be transmitted from a transmitting device to an RF module. The packet loss may indicate packets being lost due to the signals transmitted from the external device or the set-top box not being received in the RF module. A signal-to-noise ratio (SNR) may indicate a ratio of signal power strength to noise power for signals transmitted from the external device or the set-top box to the RF module.

The jitter may indicate a state in which the packet delay of signals transmitted from the external device or the set-top box to the RF module is not constant, and is changing irregularly. The jitter may indicate a state in which intervals between packets in the signals transmitted from the external device or the set-top box to the RF module are not constant, and the signals transmitted from the set-top box are arriving late or arriving early to the RF module.

Figure 3:
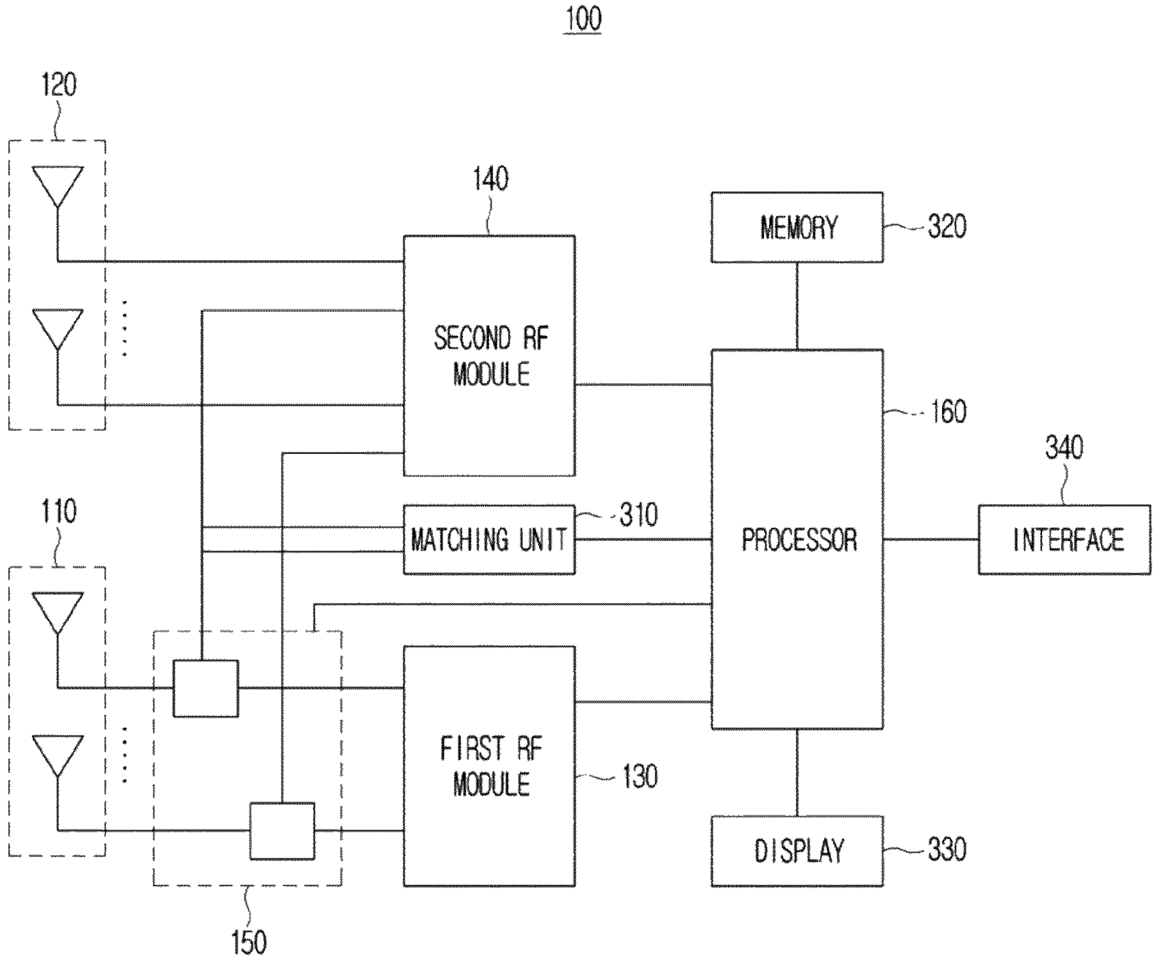
FIG. 3 is a diagram illustrating a detailed configuration of a display apparatus according to various embodiments of the disclosure.

FIG. 3 is a diagram illustrating a detailed configuration of a display apparatus according to various embodiments of the disclosure.

Referring to FIG. 3, the display apparatus 100 may include the first antenna unit 110, the second antenna unit 120, the first RF module 130, the second RF module 140, the first switching unit 150, the processor 160, a first matching unit 310, a memory 320, a display 330, and an interface 340. Detailed descriptions of configurations that overlap with the configurations shown in FIG. 2 from among the configurations shown in FIG. 3 will be omitted.

The first matching unit 310 may be a configuration for performing impedance matching for the first antenna unit 110. The first matching unit 310 may be referred to as a first matching circuit. When the first antenna unit 110 is connected to the second RF module 140, the processor 160 may perform matching of impedance of the first antenna unit 110 with frequency of signals transmitted from the set-top box 200 to receive signals transmitted from the set-top box 200 through the first antenna unit 110.

The display apparatus 100 may perform a multi link operation (MLO), a multiple-input multiple-output (MIMO) operation, or the like. The first antenna unit 110 and the second antenna unit 120 in the display apparatus 100 may include at least one antenna for transmitting and receiving any one from among the 2.4 GHz, 5 GHZ, and 6 GHz frequency bands respectively. In this case, the first antenna unit 110 and the second antenna unit 120 may transmit or receive signals of the same frequency band, or transmit and receive signals from a similar band with little difference in bandwidths. According to an embodiment, the at least one antenna for transmitting and receiving signals of the same frequency band may be included in both the first antenna unit 110 and the second antenna unit 120. For example, if the first antenna unit 110 includes antennas of the 2.4 GHz, 5 GHZ, and 6 GHz frequency bands, the second antenna unit 120 may also include antennas of the 2.4 GHz, 5 GHZ, and 6 GHz frequency bands.

At this time, if the antennas of the same frequency band are included in both the first antenna unit 110 and the second antenna unit 120, interference of the signals received from the second external device 20 through the first antenna unit 110, and the signals received from the set-top box 200 through the second antenna unit 120 may be prevented because frequency bandwidths (ranges of frequency) applied to the first antenna unit 110 and the second antenna unit 120 are different from each other. However, because there is a difference in the frequency bandwidth applied to the first antenna unit 110 and the second antenna unit 120, if one from among the first antenna unit 110 and the second antenna unit 120 is implemented as a diversity antenna, the throughput of signals transmitted and received through the diversity antenna may be reduced. For example, when the processor 160 connects the first antenna unit 110 to the second RF module 140 to use as the diversity antenna, the throughput of the first antenna unit 110 connected to the second RF module 140 may be reduced compared to the throughput of the second antenna unit 120 because there is a difference in the frequency bandwidth of the first antenna unit 110 and the second antenna unit 120.

According to an embodiment, when the processor 160 connects the first antenna unit 110 to the second RF module 140 to use as the diversity antenna, the throughput of the first antenna unit 110 and the throughput of the second antenna unit 120 may both be reduced because the wiring connected from the first antenna unit 110 to the second RF module 140, and the wiring connected from the second antenna unit 120 to the second RF module 140 affect the matching of each other.

The processor 160 may increase the throughput of signals received through the first antenna unit 110 by performing impedance matching for the first antenna unit 110. For example, the first matching unit 310 may be disposed between the first switching unit 150 and the second RF module 140. If the first antenna unit 110 operates as the diversity antenna to perform wireless communication with the set-top box 200, the processor 160 may perform matching of the impedance of the first antenna unit 110 with the frequency of signals transmitted from the set-top box 200 or the second RF module 140 by controlling the first matching unit 310. Thereby, the second RF module 140 may receive the signals transmitted from the set-top box 200 through the first antenna unit 110 and the second antenna unit 120.

Meanwhile, the impedance matching may indicate minimizing reflection signals and increasing throughput by adjusting impedance of signals transmitted from between a transmission line or an electronic device. When performing impedance matching, the throughput of signals may be increased because power or signals may be transmitted at a maximum.

The memory 320 may store at least one instruction, data, program, and the like necessary in an operation of the display apparatus 100 or the processor 160. The memory 320 may be implemented in a form of memory embedded to the display apparatus 100 according to data storage use, or implemented in a form of a memory attachable to or detachable from the display apparatus 100. For example, data for driving of the display apparatus 100 may be stored in the memory embedded to the display apparatus 100, and data for an expansion function of the display apparatus 100 may be stored in the memory attachable to or detachable from the display apparatus 100.

Meanwhile, the memory embedded to the display apparatus 100 may be implemented as at least one from among a volatile memory (e.g., a dynamic random access memory (DRAM), a static RAM (SRAM), or a synchronous dynamic RAM (SDRAM)), or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash or a NOR flash), a hard disk drive (HDD) or a solid state drive (SSD)).

The memory 320 may be implemented as a single memory that stores data generated from various operations according to the disclosure. However, according to other embodiments, the memory 320 may be implemented to include a plurality of memories which stores data of different types respectively, or stores data generated from different steps respectively.

The display 330 may be a configuration for displaying image content. The processor 160 may show, based on the image data being received through the first antenna unit 110 or the second antenna unit 120, the received image data in the display 330.

The display 330 may be implemented as a display including self-emissive devices or a display including non-emissive devices and a backlight. For example, the display 330 may be implemented as a display of various types such as, for example, and without limitation, a liquid crystal display (LCD), an organic light emitting diode (OLED) display, light emitting diodes (LEDs), a micro LED, a mini LED, a plasma display panel (PDP), a quantum dot (QD) display, a quantum dot light emitting diodes (QLED), or the like.

The interface 340 may be a configuration for receiving various data from a user or an external device. The interface 340 may receive a user command. The interface 340 may include an operating interface, an input and output interface, and the like.

For example, the operating interface may be a configuration for receiving a user operation. The operating interface may include various buttons, a touch screen, and the like provided in a main body of the display apparatus 100. The user may use the operating interface and input a user command directly to the display apparatus 100.

The input and output interface may be a configuration for inputting and outputting various external signals. The input and output interface may be connected with various external memories or external sources (e.g., a web server, a user terminal device, etc.), and receive various data. The input and output interface may be implemented as at least one interface from among a high definition multimedia interface (HDMI), a mobile high-definition link (MHL), a universal serial bus (USB), a USB C-type, a display port (DP), a Thunderbolt, a video graphics array (VGA) port, an RGB port, a D-subminiature (D-SUB), and a digital visual interface (DVI). The display apparatus 100 may receive a user command or signals through the external memory or the external source connected through the input and output interface.

Meanwhile, in the disclosure, a communication interface for communicating with an external device has been described as the WIFI module or the RF module, but the above is merely one embodiment, and may further include other communication modules. For example, the communication interface may further include at least one module from among a Bluetooth module, an infrared communication module, or other communication nodules. In addition thereto, the communication interface may include at least one communication chip for performing communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like. In addition, the display apparatus may further include a wired communication module in addition to the wireless communication module. The wired communication module may include at least one from among, for example, a local area network (LAN) module, an Ethernet module, a pair cable, a coaxial cable, an optical fiber cable, or an ultra wide-band (UWB) module.

Figure 4:
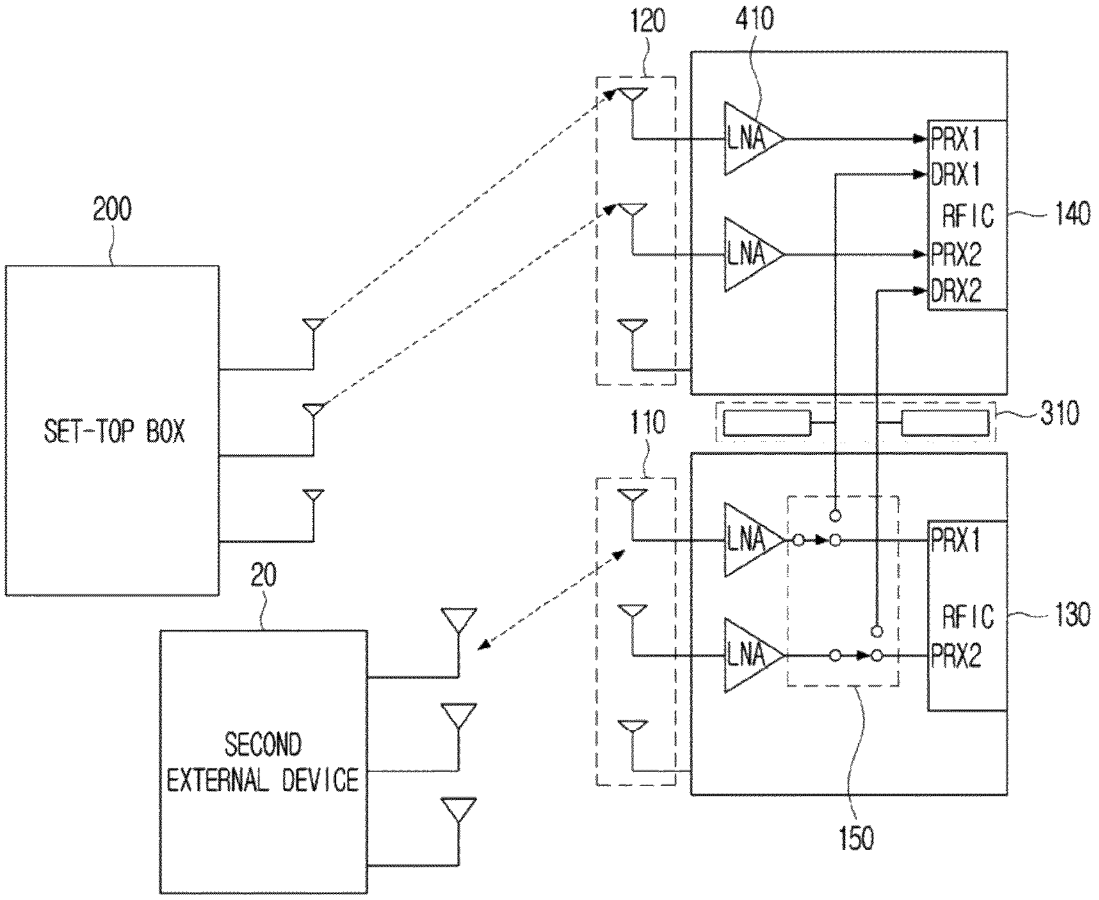
FIG. 4, FIG. 5, FIG. 6, and FIG. 7 are diagrams illustrating operations of using a first antenna unit as a diversity antenna according to various embodiments of the disclosure.

FIG. 4 to FIG. 7 are diagrams illustrating operations of using a first antenna unit as a diversity antenna according to various embodiments of the disclosure. Specifically, FIG. 4 to FIG. 7 are diagrams illustrating an operation for improving quality of signals transmitted from the set-top box 200 by using the first antenna unit 110 connected with the second external device 20 through a wireless network as the diversity antenna. Here, FIG. 4 is a diagram illustrating an operation of the first antenna unit 110 and the second antenna unit 120 receiving signals from different electronic devices 20 and 200 respectively.

The processor 160 may transmit and receive signals between the display apparatus 100 and the set-top box 200 or the second external device 20 by performing the multi link operation (MLO), the multiple-input multiple-output (MIMO), and the like. For example, the processor 160 may transmit and receive signals between the display apparatus 100 and the set-top box 200 by controlling the second RF module 140. In addition, the processor 160 may connect the display apparatus 100 to the external access point (AP) in the WIFI Station (STA) mode by controlling the first RF module 130, and transmit and receive signals between the second external device 20 and the display apparatus 100.

Referring to FIG. 4, the first antenna unit 110 may be electrically connected with the first RF module 130. The processor 160 may transmit and receive signals with the second external device 20 through the first antenna unit 110 by controlling the first RF module 130. In addition, the second antenna unit 120 may be electrically connected with the second RF module 140. The processor 160 may transmit and receive signals with the set-top box 200 through the second antenna unit 120 by controlling the second RF module 140. In this case, connection between the first antenna unit 110 and the second RF module 140 being blocked may be verified.

Figure 5:
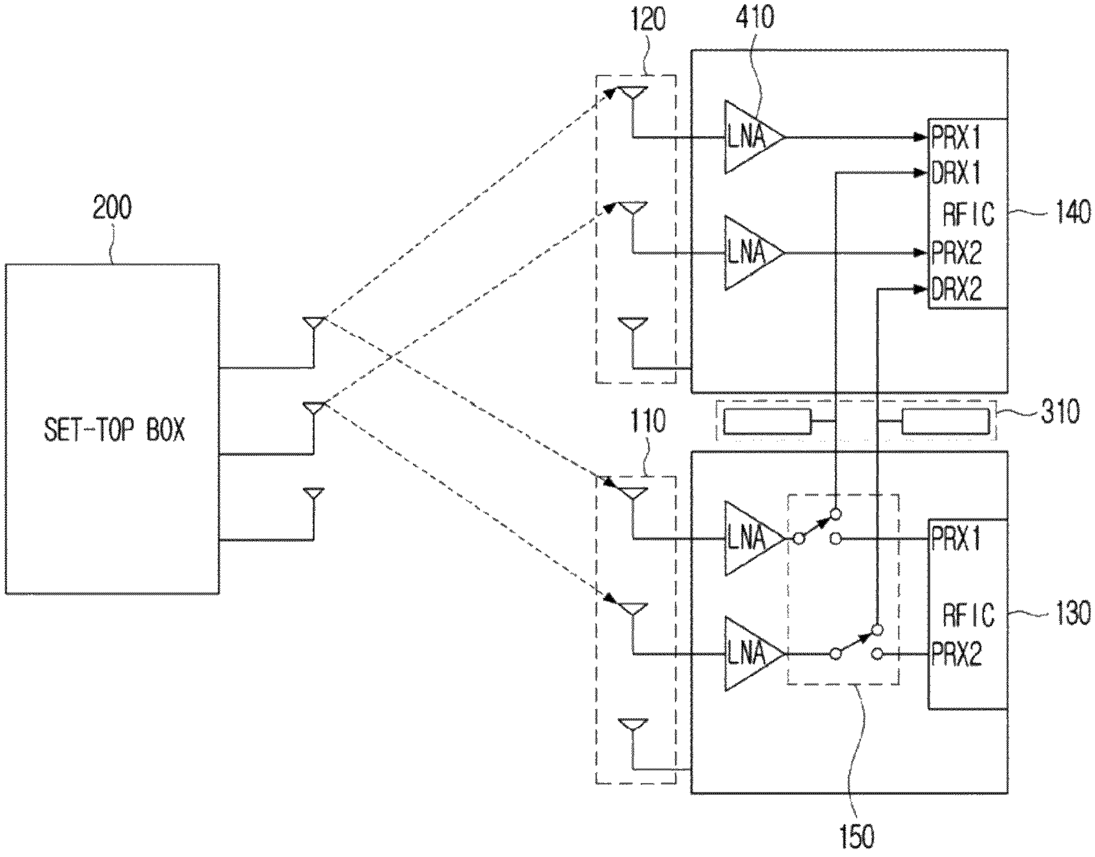

Meanwhile, in FIG. 2, the low noise amplifier (LNA) has been described as included in the first RF module 130 and the second RF module 140, but an LNA 410 may be disposed between the antennas 110 and 120 and the RF modules 130 and 140 as in FIG. 4 and FIG. 5.

FIG. 5 is a diagram illustrating an example of the first antenna unit 110 operating as the diversity antenna. Referring to FIG. 5, the processor 160 may receive signals transmitted from the set-top box 200 through the first antenna unit 110 and the second antenna unit 120 by controlling the second RF module 140. The processor 160 may connect the first antenna unit 110 to the second RF module 140 by controlling the first switching unit 150. In addition, the processor 160 may perform matching of the impedance of the first antenna unit 110 with the frequency of signals transmitted from the set-top box 200 or the second RF module 140 by controlling the first matching unit 310.

The processor 160 may operate continuously the second RF module 140 for transmitting and receiving signals between the display apparatus 100 and the set-top box 200. But the processor 160 may convert the first RF module 130 to a standby state to minimize power consumption if the first RF module 130 does not need to connect with the second external device 20. In this case, the processor 160 may improve reception sensitivity of signals transmitted from the set-top box 200 by utilizing the first antenna unit 110 as the diversity antenna, and expand a signal transmission area between the set-top box 200 and the display apparatus 100.

The processor 160 may identify the quality of signals received through the second antenna unit 120. The processor 160 may operate, based on the first RF module 130 being in the standby state, and the quality of signals received through the second antenna unit 120 being less than or equal to a predetermined reference value, the first antenna unit 110 as the diversity antenna by controlling the first switching unit 150. For example, the processor 160 may raise, based on the throughput being less than or equal to a minimum throughput due to a bit error rate (BER) of the signals received through the second antenna unit 120 increasing when the first RF module 130 is in the standby state, the throughput of signals transmitted from the set-top box 200 to the second RF module 140 by connecting the first antenna unit 110 to the second RF module 140.

The processor 160 may disconnect (off), based on the first RF module 130 being in the standby state and a signal quality of the second antenna unit 120 being less than or equal to a reference value, the connection between the first antenna unit 110 and the first RF module 130 by controlling the first switching unit 150, and connect the first antenna unit 110 to the second RF module 140.

The processor 160 may operate, based on the signal quality of the second antenna unit 120 being less than or equal to a reference value, and a user command for performing wireless communication with the set-top box 200 being input through the interface 340 when the first RF module 130 is in the operating state, the first antenna unit 110 as the diversity antenna by controlling the first switching unit 150. The processor 160 may convert, based on a user command being input through the interface 340, the first RF module 130 to the standby state, and control the first switching unit 150 for the first antenna unit 110 to be connected to the second RF module 140 to perform wireless communication with the set-top box 200.

The processor 160 may periodically identify, based on the first antenna unit 110 being connected to the second RF module 140 to perform wireless communication with the set-top box 200, the signals received through the second antenna unit 120. In this case, the processor 160 may disconnect (off), based on the signal quality of the second antenna unit 120 being greater than or equal to a reference value, connection between the first antenna unit 110 and the second RF module 140 to minimize power consumption, and control the first switching unit 150 to connect the first antenna unit 110 to the first RF module 130.

The processor 160 may perform matching of the impedance of the first antenna unit 110 with the frequency of signals transmitted from the set-top box 200 by controlling the first matching unit 310 for the first antenna unit 110 to smoothly receive the signals transmitted from the set-top box 200. In this case, the first matching unit 310 may be disclosed between the first switching unit 150 and the second RF module 140.

Meanwhile, referring to FIG. 4 and FIG. 5, the second RF module 140 may include PRX ports PRX1, PRX2, . . . and DRX ports DRX1, DRX2, . . . . The PRX ports may be configuration for receiving primary signals transmitted from the set-top box 200 through the second antenna unit 120. The DRX ports may be configurations for receiving diversity signals transmitted from the set-top box 200 through the first antenna unit 110 when the first antenna unit 110 is connected to the second RF module 140.

For example, when the first antenna unit 110 is connected to the second RF module 140 to operate as the diversity antenna, the second RF module 140 may receive signals received through the second antenna unit 120 through the PRX ports, and receive signals received through the first antenna unit 110 through the DRX ports. In this case, the processor 160 may combine the primary signals input through the PRX ports and the diversity signals input through the DRX ports by controlling the second RF module 140.

The processor 160 may combine the primary signals and the diversity signals using a selective combining method, a maximal ratio combining method, an equal gain combining method, a switched combining method, or the like. The selective combining method may be a method for selecting a signal with the highest reception power from among the several input signals. The maximal ratio combining method may be a method for combining each signal input in the RF module according to a predetermined ratio. In the case of the maximal ratio combining method, a process of determining a ratio for combining the signals input in the RF module may be necessary. The equal gain combining method may be a method for combining the signals input in the RF module with a same phase.

The switched combining method may be a method for selecting one signal from among the signals input in the RF module, comparing the selected signal with a reference signal value (e.g., a threshold level), and determining a different signal as the received signal if reception power of the selected signal is smaller than the reference signal value (e.g., threshold level). For example, in the case of the switched combining method, the processor 160 may compare a primary signal input in the second RF module 140 with the reference signal value and determine the primary signal as the received signal of the second RF module 140 if the primary signal is greater than the reference signal value, and determine a diversity signal as the received signal of the second RF module 140 if the primary signal is smaller than the reference signal value.

Although not shown in FIG. 4 and FIG. 5, the second RF module 140 may include a coupler for combining the primary signal and the diversity signal. The coupler may be a configuration for combining a plurality of signals input in the RF module and outputting as one signal. Because the coupler is a publically-known configuration for signal processing, a detailed description thereof will be omitted.

Figure 6:
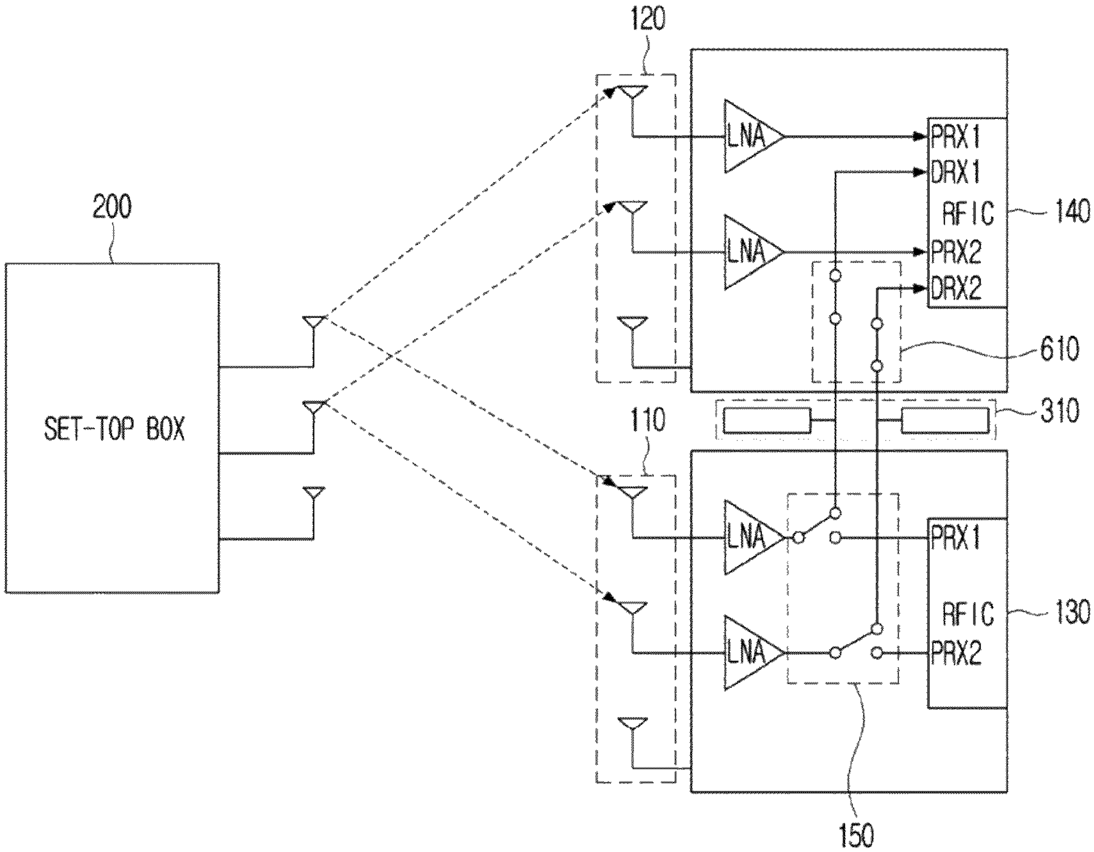
Figure 7:
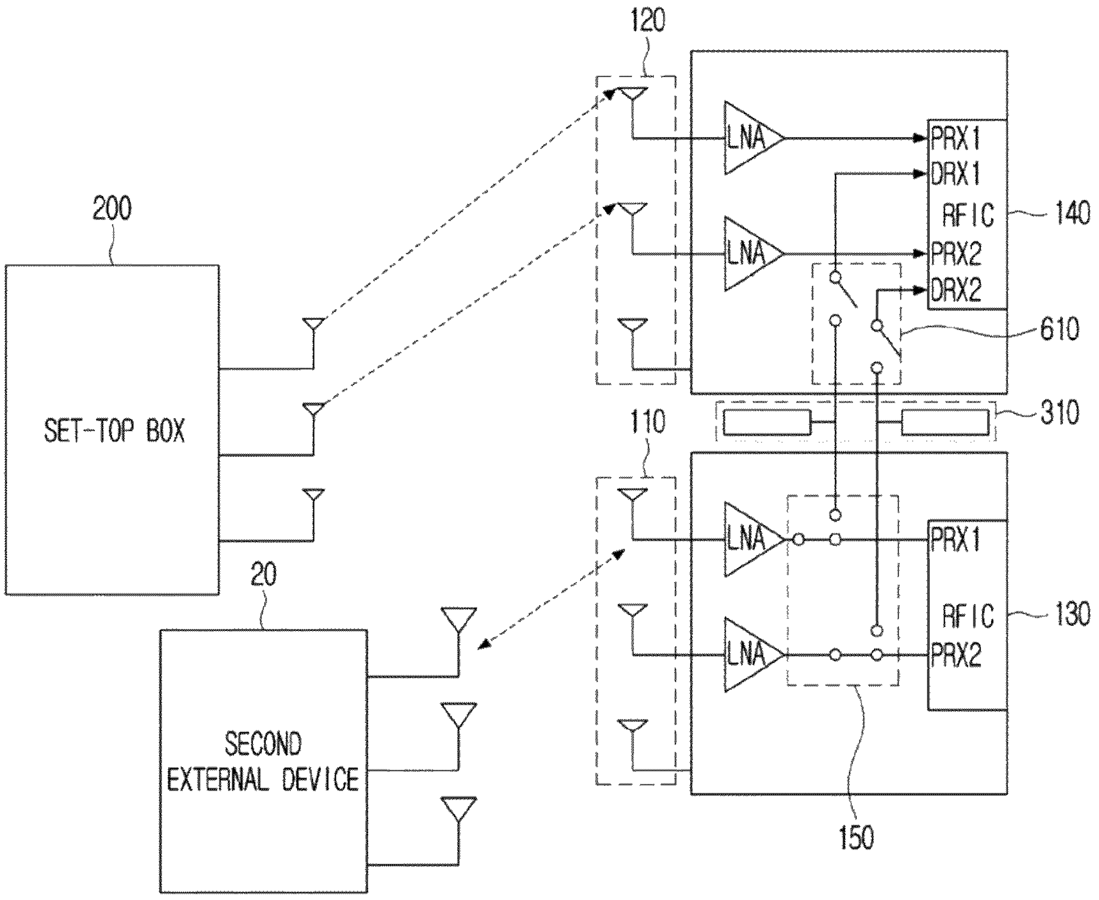

FIG. 6 and FIG. 7 are diagrams illustrating operations for reducing impedance influence by wiring connected to the second RF module 140. Specifically, FIG. 6 and FIG. 7 are diagrams illustrating an operation for reducing impedance influence by wiring if the wiring connected from the first antenna unit 110 to the second RF module 140 affects impedance matching between the second antenna unit 120 and the second RF module 140.

Referring to FIG. 6, the display apparatus 100 may further include a second switching unit 610 disposed between the first matching unit 310 and the second RF module 140. The second switching unit 610 may be a configuration for selectively connecting or blocking wiring connected from the first antenna unit 110 to the second RF module 140.

In FIG. 6, a state in which the second switching unit 610 is connected to connect the first antenna unit 110 to the second RF module 140 is shown. Because an operation for this case is the same as the operation shown in FIG. 5, redundant descriptions thereof will be omitted.

FIG. 7 shows the processor 160 connecting the first antenna unit 110 to the first RF module 130 to transmit and receive signals with the second external device 20 through the first antenna unit 110.

The processor 160 may disconnect (off) connection between the first antenna unit 110 and the second RF module 140 by controlling the first switching unit 150, and connect the first antenna unit 110 to the first RF module 130. In this case, the wiring between the first switching unit 150 and the second RF module 140 may affect impedance matching for the second antenna unit 120.

Meanwhile, the processor 160 may perform impedance matching for the second antenna unit 120 and the transmission line to raise the throughput of signals transmitted and received in the second RF module 140 through the second antenna unit 120. For example, the processor 160 may match the second antenna unit 120 and impedance for the second RF module 140 to 50 ohm taking into consideration power transmission and a distortion aspect of a signal waveform.

In this case, if a length of a transmission line connected to the second RF module 140 becomes longer, impedance for the second RF module 140 may increase due to the transmission line. The second antenna unit 120 and the second RF module 140, and the transmission line from the second antenna unit 120 to the second RF module 140 may be matched to an impedance optimized to the signals received from the set-top box 200. At this time, if the length of wiring connecting from the first antenna unit 110 to the second RF module 140 is increased, impedance for the second RF module 140 may be increased.

The processor 160 may control, based on the first antenna unit 110 being connected to the first RF module 130 to perform wireless communication with the second external device 20, the second switching unit 610 to block (off) the wiring connected from the first antenna unit 110 to the second RF module 140.

FIG. 8 to FIG. 11 are diagrams illustrating operations of selectively using a first antenna unit and a second antenna unit as a diversity antenna according to various embodiments of the disclosure. Specifically, FIG. 8 to FIG. 11 are diagrams illustrating operations of using the first antenna unit 110 as the diversity antenna, or using the second antenna unit 120 as the diversity antenna.

Figure 8:
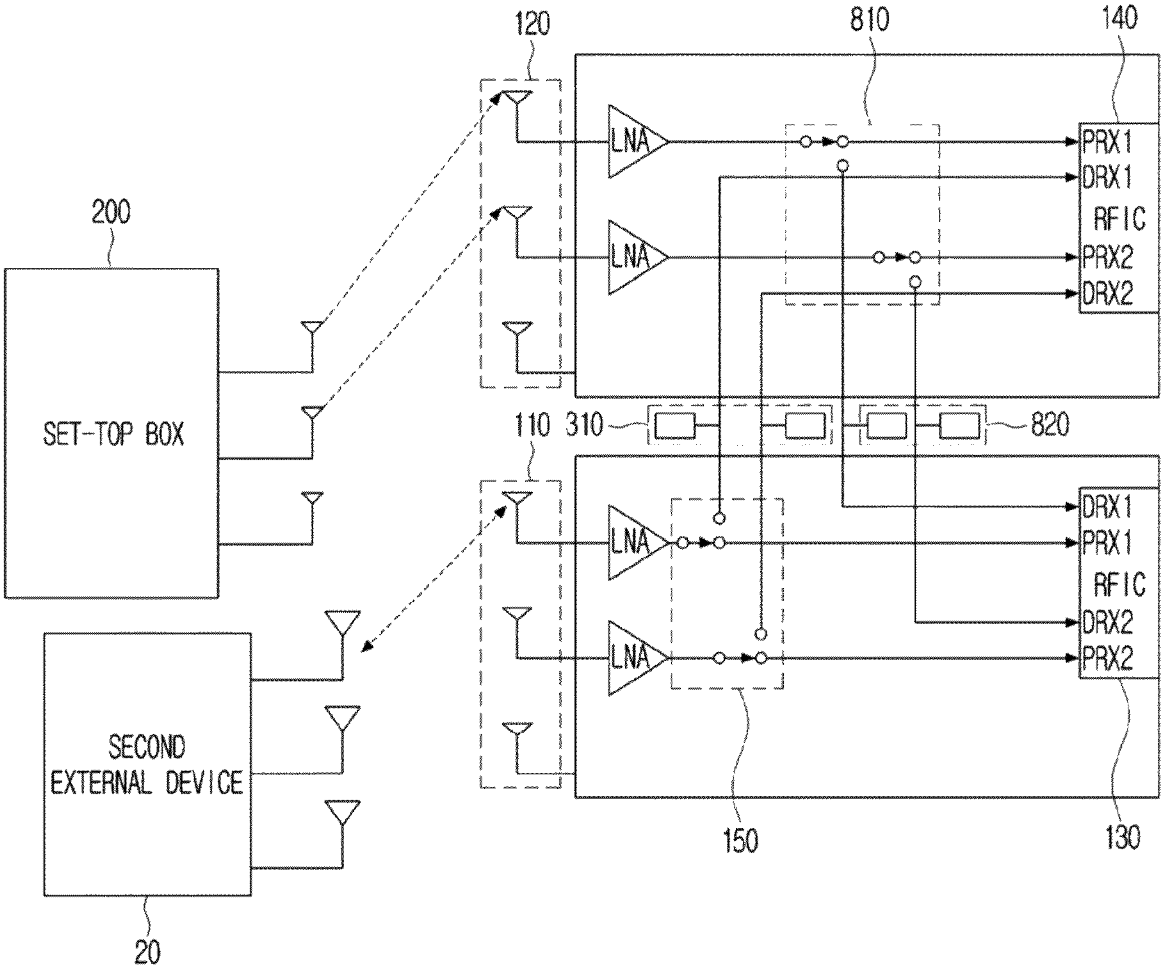
FIG. 8, FIG. 9, FIG. 10, and FIG. 11 are diagrams illustrating operations of selectively using a first antenna unit and a second antenna unit as a diversity antenna according to various embodiments of the disclosure.

Referring to FIG. 8, the display apparatus 100 may further include a third switching unit 810 and a second matching unit 820. Detailed descriptions of configurations that overlap with the configurations shown in FIG. 2 to FIG. 5 from among the configurations shown in FIG. 8 will be omitted.

The third switching unit 810 may be a configuration for selectively connecting the second antenna unit 120 to the first RF module 130 or the second RF module 140. The third switching unit 810 may include at least one switch disposed between each of the antennas included in the second antenna unit 120 and the first RF module 130 or the second RF module 140. For example, the third switching unit 810 may be configured using the publically-known single pole double throw (SPDT).

The second matching unit 820 may be a configuration for performing impedance matching for the second antenna unit 120. The second matching unit 820 may be referred to as a second matching circuit. When the second antenna unit 120 is connected to the first RF module 130, the processor 160 may perform matching of the impedance of the second antenna unit 120 with the frequency of signals transmitted from the second external device 20 to receive the signals transmitted from the second external device 20 through the second antenna unit 120.

The processor 160 may increase the throughput of signals received through the second antenna unit 120 by performing impedance matching for the second antenna unit 120. The second matching unit 820 may be disposed between the third switching unit 810 and the first RF module 130. If the second antenna unit 120 operates as the diversity antenna to perform wireless communication with the second external device 20, the processor 160 may perform matching of the impedance of the second antenna unit 120 with the frequency of signals transmitted from the second external device 20 or the first RF module 130 by controlling the second matching unit 820. Based on the above, the first RF module 130 may receive the signals transmitted from the second external device 20 through the first antenna unit 110 and the second antenna unit 120.

Referring to FIG. 8, the processor 160 may connect the first antenna unit 110 with the first RF module 130 by controlling the first switching unit 150. The first RF module 130 may transmit and receive signals with the second external device 20 through the first antenna unit 110. In addition, the processor 160 may connect the second antenna unit 120 with the second RF module 140 by controlling the third switching unit 810. The second RF module 140 may transmit and receive signals with the set-top box 200 through the second antenna unit 120.

In this case, whether connection between the first antenna unit 110 and the second RF module 140 is blocked may be verified. In addition, whether a connection between the second antenna unit 120 and the first RF module 130 is blocked may be verified.

The processor 160 may improve the quality of signals transmitted from the set-top box 200 to the second RF module 140 by using the first antenna unit 110 as the diversity antenna, or improve the quality of signals transmitted from the second external device 20 to the first RF module 130 by using the second antenna unit 120 as the diversity antenna.

Figure 9:
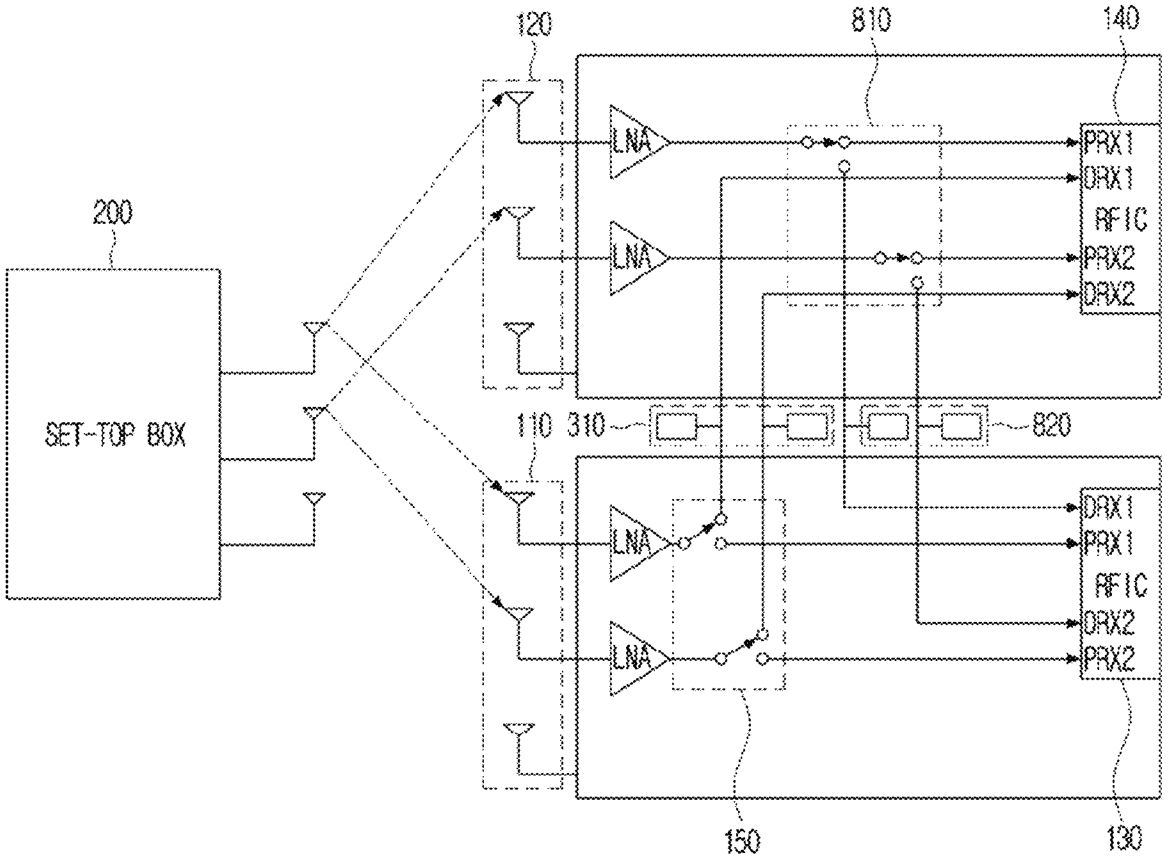

FIG. 9 is a diagram illustrating an example in which the first antenna unit 110 is operated as the diversity antenna. Referring to FIG. 9, as described in FIG. 5, the processor 160 may receive signals transmitted from the set-top box 200 through the first antenna unit 110 and the second antenna unit 120 by controlling the second RF module 140. For example, the processor 160 may control the third switching unit 810 for the second antenna unit 120 to maintain connection with the second RF module 140. In this case, connection between the second antenna unit 120 and the first RF module 130 may be blocked. The processor 160 may disconnect (off) the connection between the first antenna unit 110 and the first RF module 130 by controlling the first switching unit 150, and connect the first antenna unit 110 to the second RF module 140.

In addition, the processor 160 may perform impedance matching for the first antenna unit 110 so that the first antenna unit 110 is able to receive the signals transmitted from the set-top box 200 by controlling the first matching unit 310 disposed between the first switching unit 150 and the second RF module 140.

Figure 10:
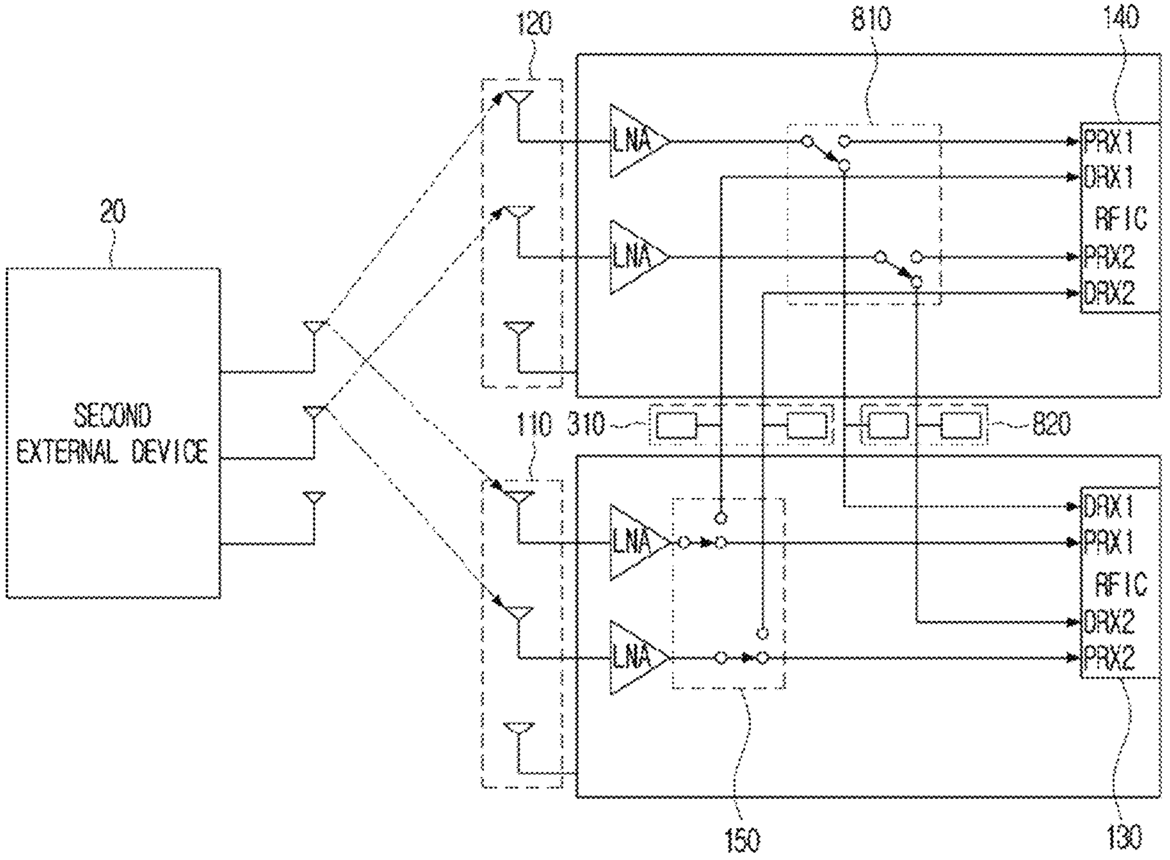

FIG. 10 is a diagram illustrating an example in which the second antenna unit 120 is operated as the diversity antenna. Referring to FIG. 10, the processor 160 may receive signals transmitted from the second external device 20 through the first antenna unit 110 and the second antenna unit 120 by controlling the first RF module 130. Specifically, the processor 160 may identify the signals received through the first antenna unit 110.

The processor 160 may control, based on the second RF module 140 being in the standby state, and the quality of signals received through the first antenna unit 110 being less than or equal to a reference value, the third switching unit 810 for the second antenna unit 120 to be connected to the first RF module 130 to perform wireless communication with the second external device 20. For example, if the third switching unit 810 is implemented as the single pole double throw (SPDT), the processor 160 may disconnect (off) connection between the second antenna unit 120 and the second RF module 140 by controlling the third switching unit 810, and connect the second antenna unit 120 to the first RF module 130. In this case, the processor 160 may control the first switching unit 150 for the first antenna unit 110 to maintain connection with the first RF module 130. In addition, connection between the first antenna unit 110 and the second RF module 140 may be blocked.

The processor 160 may operate, based on the signal quality of the first antenna unit 110 being less than or equal to the reference value, and a user command for performing wireless communication with the second external device 20 being input through the interface 340 when the second RF module 140 is in the operating state, the second antenna unit 120 as the diversity antenna by controlling the third switching unit 810. The processor 160 may convert, based on the user command being input through the interface 340, the second RF module 140 to the standby state, and control the third switching unit 810 for the second antenna unit 120 to be connected to the first RF module 130 to perform wireless communication with the second external device 20.

The processor 160 may periodically identify, based on the second antenna unit 120 being connected to the first RF module 130 to perform wireless communication with the second external device 20, the signals received through the first antenna unit 110. In this case, the processor 160 may disconnect (off), based on the signal quality of the first antenna unit 110 being greater than or equal to a reference value, connection between the second antenna unit 120 and the first RF module 130, and control the third switching unit 810 to connect the second antenna unit 120 to the second RF module 140.

In addition, if the second antenna unit 120 operates as the diversity antenna to perform wireless communication with the second external device 20, the processor 160 may perform impedance matching for the second antenna unit 120 so that the second antenna unit 120 is able to receive the signals transmitted from the second external device 20 by controlling the second matching unit 820.

Figure 11:
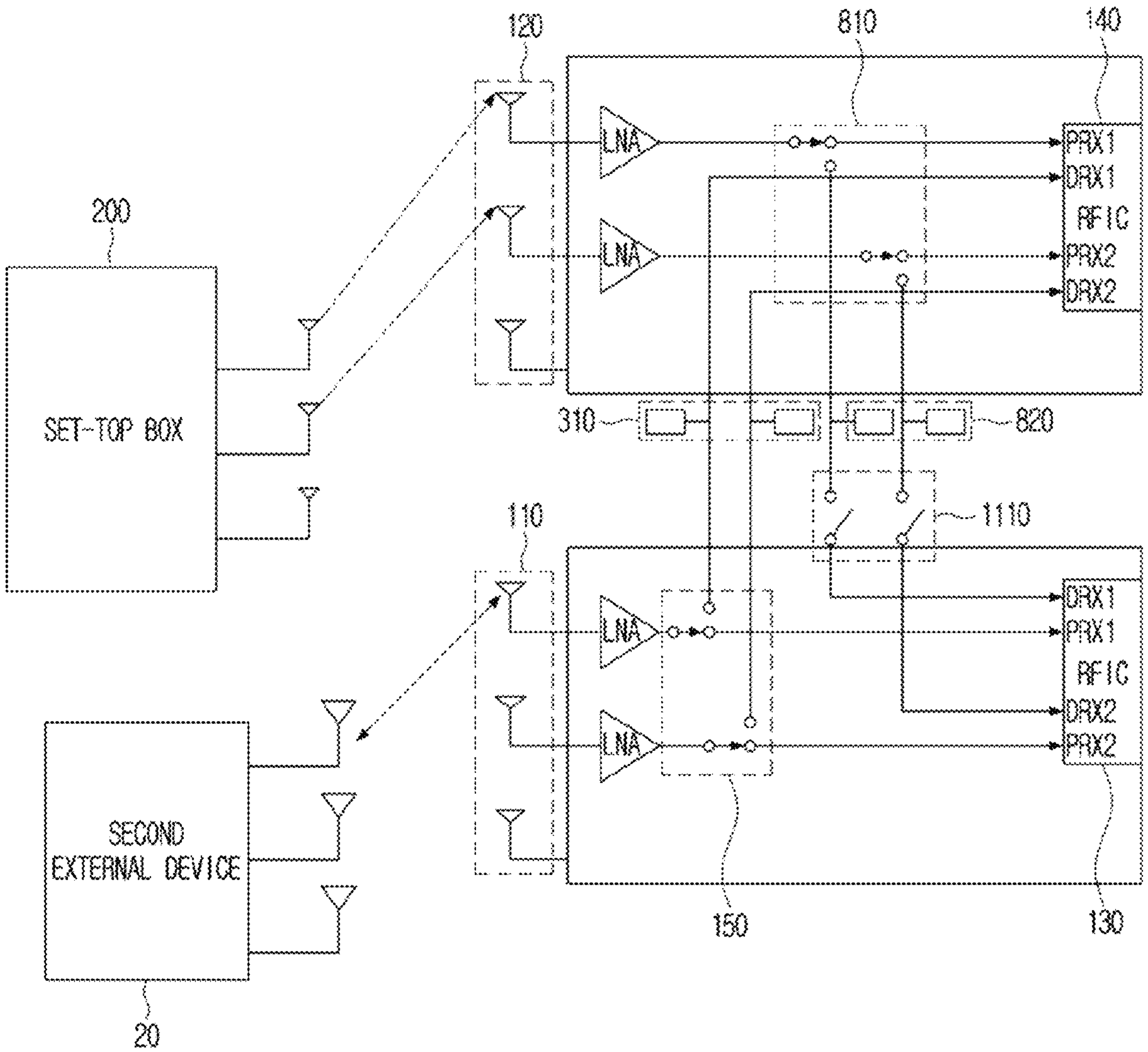

FIG. 11 is a diagram illustrating an operation for reducing impedance influence by wiring connected to the first RF module 130. Specifically, FIG. 11 is a diagram illustrating an operation for reducing impedance influence by wiring if the wiring connected from the second antenna unit 120 to the first RF module 130 affects impedance matching between the first antenna unit 110 and the first RF module 130.

Referring to FIG. 11, the display apparatus 100 may further include a fourth switching unit 1110 disposed between the second matching unit 820 and the first RF module 130. The fourth switching unit 1110 may be a configuration for selectively connecting or blocking the wiring connected from the second antenna unit 120 to the first RF module 130. In this case, the position of the fourth switching unit 1110 may be advantageous the closer it is disposed to the first RF module 130.

In FIG. 8 to FIG. 10, when the operation of the diversity antenna for the second antenna unit 120 is ended, that the processor 160 may disconnect (off) connection between the second antenna unit 120 and the first RF module 130, and control the third switching unit 810 to connect the second antenna unit 120 to the second RF module 140. In this case, if the wiring between the third switching unit 810 and the first RF module 130 becomes longer, it may affect impedance matching for the first antenna unit 110 or the first RF module 130 due to the wiring.

The processor 160 may control, based on the second antenna unit 120 being connected to the second RF module 140 to perform wireless communication with the set-top box 200, the fourth switching unit 1110 to block (off) the wiring connected from the second antenna unit 120 to the first RF module 130.

As described above, the display apparatus 100 according to the disclosure may improve, based on the quality of signals transmitted from the set-top box 200 through the second antenna unit 120 being less than or equal to a reference value, the quality of signals received from the set-top box 200 by connecting the first antenna unit 110 to the second RF module 140. In addition, the display apparatus 100 according to the disclosure may improve, based on the quality of signals received from the second external device 20 through the first antenna unit 110 being less than or equal to a reference value, the quality of signals received from the second external device 20 by connecting the second antenna unit 120 to the first RF module 130.

Figure 12:
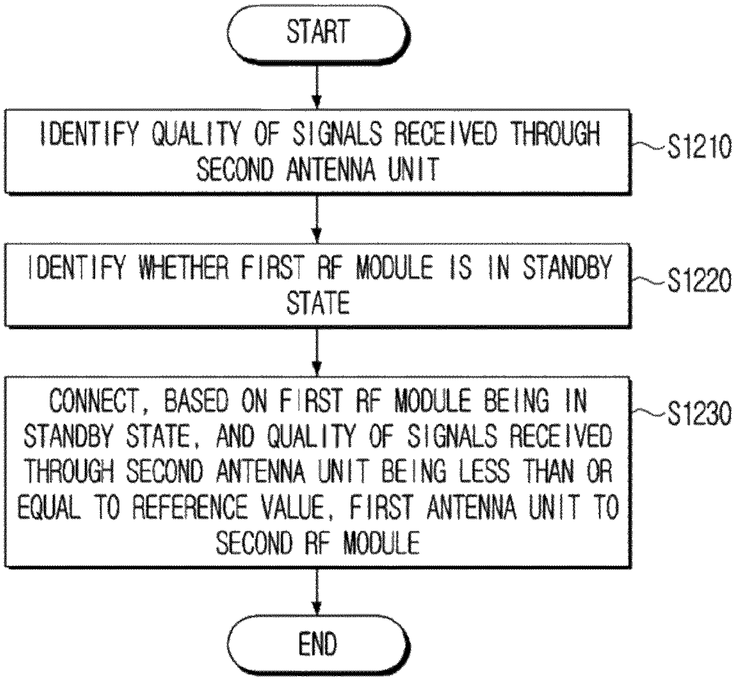
FIG. 12 and FIG. 13 are flowcharts illustrating a control method of a display apparatus according to various embodiments of the disclosure.
Figure 13:
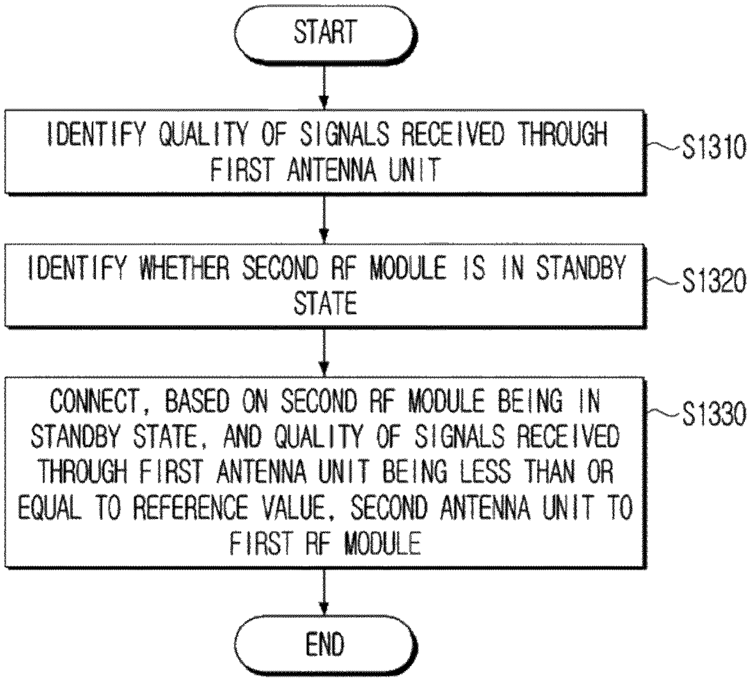

FIG. 12 and FIG. 13 are flowcharts illustrating a control method of a display apparatus according to various embodiments of the disclosure. Specifically, FIG. 12 is a diagram illustrating a method for operating the first antenna unit as the diversity antenna.

Referring to FIG. 12, the display apparatus may include a first RF module to perform wireless communication with the external device using the first antenna unit, and a second RF module to perform wireless communication with the set-top box using the second antenna unit.

The display apparatus may identify the quality of signals received through the second antenna unit (S1210). For example, if the display apparatus is connected with the set-top box through a wireless network, signals transmitted from the set-top box to the display apparatus may have to satisfy a minimum throughput or more. In an example, in order for the display apparatus to perform an 8 Kbit video communication with the set-top box, a throughput of a minimum 300 Mbps or more is required. However, the strength of the signals transmitted from the set-top box to the display apparatus may decrease as the distance between the display apparatus and the set-top box becomes farther. A relationship between the signals transmitted from the set-top box to the display apparatus and the distance may be represented as in [Equation 1] below.

$$P = k\frac{1}{d^2}P_t \quad \text{[Equation 1]}$$

Here, P represents a power value indicating the strength of the signals received from the display apparatus, and k represents a proportional constant. d represents the distance between the display apparatus and the set-top box, and $P_t$ represents a power value indicating the strength of the signals transmitted from the set-top box.

The strength of signals received from the display apparatus may decrease due to the distance between the display apparatus and the set-top box increasing, or the signals transmitted from the set-top box to the display apparatus may not satisfy the minimum throughput due to obstacles positioned between the display apparatus and the set-top box. The display apparatus may identify the signals received through the second antenna unit, and identify whether the received signals are greater than or equal to the minimum throughput.

The display apparatus may identify whether the first RF module is in the standby state (S1220). Although the display apparatus may continuously operate the second RF module to transmit and receive signals between the display apparatus and the set-top box, the first RF module may be converted to the standby state to minimize power consumption if there is no need to connect with the external device.

The display apparatus may connect, based on first RF module being in the standby state and the quality of signals received through the second antenna unit being less than or equal to a predetermined reference value, the first antenna unit to the second RF module for the first antenna unit to perform wireless communication with the set-top box (S1230). For example, the display apparatus may disconnect connection between the first antenna unit and the first RF module by controlling the switch, and connect the first antenna unit to the second RF module. In this case, the display apparatus may maintain, based on the first RF module being in the operating state, or the quality of signals received through the second antenna unit being greater than or equal to a reference value, a connection state between the first antenna unit and the first RF module.

In addition, the display apparatus may perform, based on the first antenna unit being connected to the second RF module, matching of impedance of the first antenna unit with the frequency of signals transmitted from the set-top box. The display apparatus may perform, based on the first antenna unit being connected to the second RF module, matching of impedance of the first antenna unit with the frequency of signals transmitted from the set-top box to receive the signals transmitted from the set-top box through the first antenna unit.

Meanwhile, the display apparatus may convert, based on the first RF module being in the operating state, and the quality of signals received through the second antenna unit being less than or equal to a reference value, the first RF module to the standby state if a user command for performing wireless communication with the set-top box is input. In addition, the display apparatus may connect the first antenna unit to the second RF module for the first antenna unit to perform wireless communication with the set-top box.

The display apparatus may periodically identify, based on the first antenna unit being connected to the second RF module to perform wireless communication with the set-top box, the signals received through the second antenna unit. In this case, the display apparatus may disconnect (off), based on the signal quality of the second antenna unit being greater than or equal to a reference value, connection between the first antenna unit and the second RF module, and connect the first antenna unit to the first RF module.

In this case, the first antenna unit and the second antenna unit may transmit and receive signals of the same frequency band, or transmit and receive signals from a similar band with little difference in bandwidths. If the first antenna unit and the second antenna unit operate in the same frequency band, interference of the signals received from the external device through the first antenna unit, and the signals received from the set-top box through the second antenna unit may be prevented because frequency bandwidths (ranges of frequency) applied to the first antenna unit and the second antenna unit are different from each other.

The first antenna unit and the second antenna unit may include at least one antenna for transmitting and receiving any one from among the 2.4 GHz, 5 GHZ, and 6 GHz frequency bands respectively. For example, if the first antenna unit includes antennas of the 2.4 GHz, 5 GHZ, and 6 GHz frequency bands, the second antenna unit may also include antennas of the 2.4 GHz, 5 GHZ, and 6 GHz frequency bands.

FIG. 13 is a diagram illustrating a method for operating the second antenna unit as the diversity antenna.

Referring to FIG. 13, the display apparatus may identify the quality of signals received through the first antenna unit (S1310). For example, if the display apparatus is connected with the external device through a first antenna, signals transmitted from the external device through the first antenna may have to satisfy the minimum throughput or more. However, the strength of the signals received from the display apparatus may decrease as the distance between the display apparatus and the external device becomes farther, or the signals transmitted from the external device to the display apparatus may not satisfy the minimum throughput due to interfering factors such as obstacles positioned between the display apparatus and the external device. The display apparatus may identify the signals received through the first antenna unit, and identify whether the received signals are greater than or equal to the minimum throughput.

The display apparatus may identify whether the second RF module is in the standby state (S1320). The display apparatus may convert the first RF module or the second RF module to the standby state to minimize power consumption.

The display apparatus may connect, based on the second RF module being in the standby state and the quality of signals received through the first antenna unit being less than or equal to a reference value, the second antenna unit to the first RF module for the second antenna unit to perform wireless communication with the external device (S1330). For example, the display apparatus may disconnect connection between the second antenna unit and the second RF module by controlling the switch, and connect the second antenna unit to the first RF module. In this case, the display apparatus may maintain, based on the second RF module being in the operating state, or the throughput of signals received through the first antenna unit being greater than or equal to a minimum throughput, a connection state between the second antenna unit and the second RF module.

In addition, the display apparatus may perform, based on the second antenna unit being connected to the first RF module, matching of impedance of the second antenna unit with the frequency of signals received from the external device. Specifically, the display apparatus may perform, based on the second antenna unit being connected to the first RF module, matching of impedance of the second antenna unit with the frequency of signals transmitted from the external device to receive the signals transmitted from the external device through the second antenna unit.

Meanwhile, the display apparatus may convert, based on the second RF module being in the operating state, and the quality of signals received through the first antenna unit being less than or equal to a reference value, the second RF module to the standby state when a user command for performing wireless communication with the external device is input. In addition, the display apparatus may connect the second antenna unit to the first RF module for the second antenna unit to perform wireless communication with the external device.

The display apparatus may periodically identify, based on the second antenna unit being connected to the first RF module to perform wireless communication with the external device, the signals received through the first antenna unit. In this case, the display apparatus may disconnect (off), based on the signal quality of the first antenna unit being greater than or equal to a reference value, connection between the second antenna unit and the first RF module, and connect the second antenna unit to the second RF module.

Meanwhile, according to an embodiment of the disclosure, the various embodiments described above may be implemented with software including instructions stored in a machine-readable storage media (e.g., computer). The machine may call a stored instruction stored from a storage medium, and as an apparatus operable according to the called instruction, may include the electronic apparatus according to the above-mentioned embodiments. Based on a command being executed by the processor, the processor may directly or using other elements under the control of the processor perform a function corresponding to the command. The command may include a code generated by a compiler or executed by an interpreter. A machine-readable storage medium may be provided in a form of a non-transitory storage medium. Herein, 'non-transitory' merely means that the storage medium is tangible and does not include a signal, and the term does not differentiate data being semi-permanently stored or being temporarily stored in the storage medium.

In addition, according to an embodiment of the disclosure, a method according to the various embodiments described above may be provided included a computer program product. The computer program product may be exchanged between a seller and a purchaser as a commodity. The computer program product may be distributed in a form of the machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, each of the elements (e.g., a module or a program) according to the various embodiments described above may be formed as a single entity or a plurality of entities, and a portion of sub-elements of the above-mentioned sub-elements may be omitted, or other sub-elements may be further included in the various embodiments. Alternatively or additionally, a portion of the elements (e.g., modules or programs) may be integrated into one entity to perform the same or similar functions performed by the respective elements prior to integration. Operations performed by a module, a program, or another element, in accordance with various embodiments, may be executed sequentially, in a parallel, repetitively, or in a heuristic manner, or at least a portion of the operations may be executed in a different order, omitted or a different operation may be added.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A display apparatus, comprising:

a first antenna unit configured to perform wireless communication with an external device;

a first radio-frequency (RF) circuit configured to transmit and receive signals through the first antenna unit;

a second antenna unit configured to perform wireless communication with a set-top box;

a second RF circuit configured to transmit and receive signals through the second antenna unit;

a first switch configured to selectively connect the first antenna unit to the first RF circuit and to the second RF circuit;

a memory storing instructions; and at least one processor configured to execute the instructions to:

identify a quality of signals received through the second antenna unit, and based on the first RF circuit being in a standby state and the quality of signals received through the second antenna unit being less than or equal to a predetermined reference value, control the first switch to connect the first antenna unit to the second RF circuit to perform wireless communication with the set-top box.

2. The display apparatus of claim 1, further comprising:

a first matching circuit between the first switch and the second RF circuit, the first matching circuit being configured to control an impedance of the first antenna unit to correspond with a frequency of signals received from the set-top box.

3. The display apparatus of claim 2, further comprising:

a second switch between the first matching circuit and the second RF circuit, the second switch being configured to selectively connect wiring from the first antenna unit to the second RF circuit, wherein the at least one processor is further configured to execute the instructions to:

based on the first antenna unit being connected to the first RF circuit, control the second switch to disconnect the wiring from the first antenna unit to the second RF circuit.

4. The display apparatus of claim 1, further comprising:

an interface configured to receive a user input for performing wireless communication with the set-top box, wherein the at least one processor is further configured to execute the instructions to:

based on the quality of signals received through the second antenna unit being less than or equal to the predetermined reference value and the user input being received through the interface, convert the first RF circuit to the standby state, and control the first switch to connect the first antenna unit to the second RF circuit to perform wireless communication with the set-top box.

5. The display apparatus of claim 1, further comprising:

a third switch configured to selectively connect the second antenna unit to the first RF circuit and to the second RF circuit, wherein the at least one processor is further configured to execute the instructions to:

identify a quality of signals received through the first antenna unit, and based on the second RF circuit being in the standby state and the quality of signals received through the first antenna unit being less than or equal to a second reference value, control the third switch to connect the second antenna unit to the first RF circuit to perform wireless communication with the external device.

6. The display apparatus of claim 5, further comprising:

a second matching circuit between the third switch and the first RF circuit, the second matching circuit being configured to control an impedance of the second antenna unit to correspond with a frequency of signals received from the external device.

7. The display apparatus of claim 6, further comprising:

a fourth switch between the second matching circuit and the first RF circuit, the fourth switch being configured to selectively connect wiring from the second antenna unit to the first RF circuit, wherein the at least one processor is further configured to execute the instructions to:

based on the second antenna unit being connected to the second RF circuit, control the fourth switch to disconnect the wiring from the second antenna unit to the first RF circuit.

8. The display apparatus of claim 5, further comprising:

an interface configured to receive a user input for performing wireless communication with the external device, wherein the at least one processor is further configured to execute the instructions to:

based on the quality of signals received through the first antenna unit being less than or equal to the second reference value and the user input being received through the interface, convert the second RF circuit to the standby state, and control the third switch to connect the second antenna unit to the first RF circuit to perform wireless communication with the external device.

9. A control method of a display apparatus including a first radio-frequency (RF) circuit configured to perform wireless communication with an external device through a first antenna unit and a second RF circuit configured to perform wireless communication with a set-top box through a second antenna unit, the method comprising:

identifying a quality of signals received through the second antenna unit;

identifying whether the first RF circuit is in a standby state or not in the standby state; and based on the first RF circuit being in the standby state and the quality of signals received through the second antenna unit being less than or equal to a predetermined reference value, connecting the first antenna unit to the second RF circuit to perform wireless communication with the set-top box.

10. The method of claim 9, wherein the connecting the first antenna unit to the second RF circuit comprises:

controlling an impedance of the first antenna unit to correspond with a frequency of signals received from the set-top box.

11. The method of claim 9, further comprising:

receiving a user input for performing wireless communication with the set-top box, wherein the connecting the first antenna unit to the second RF circuit comprises:

based on the first RF circuit not being in the standby state and the quality of signals received through the second antenna unit being less than or equal to the predetermined reference value, converting the first RF circuit to the standby state, and connecting the first antenna unit to the second RF circuit to perform wireless communication with the set-top box.

12. The method of claim 9, further comprising:

identifying a quality of signals received through the first antenna unit;

identifying whether the second RF circuit is in the standby state or not in the standby state; and based on the second RF circuit being in the standby state and the quality of signals received through the first antenna unit being less than or equal to a second reference value, connecting the second antenna unit to the first RF circuit to perform wireless communication with the external device.

13. The method of claim 12, wherein the connecting the second antenna unit to the first RF circuit comprises:

controlling an impedance of the second antenna unit to correspond with a frequency of signals received from the external device.

14. The method of claim 12, further comprising:

receiving a user input for performing wireless communication with the external device, wherein the connecting the second antenna unit to the first RF circuit comprises:

based on the second RF circuit being in an operating state and the quality of signals received through the first antenna unit being less than or equal to the second reference value, converting the second RF circuit to the standby state, and connecting the second antenna unit to the first RF circuit to perform wireless communication with the external device.

15. A non-transitory computer-readable recording medium storing a program for executing a control method of a display apparatus including a first radio-frequency (RF) circuit configured to perform wireless communication with an external device through a first antenna unit and a second RF circuit configured to perform wireless communication with a set-top box through a second antenna unit, the method comprising:

identifying a quality of signals received through the second antenna unit;

identifying whether the first RF circuit is in a standby state or not in the standby state; and based on the first RF circuit being in the standby state and the quality of signals received through the second antenna unit being less than or equal to a predetermined reference value, connecting the first antenna unit to the second RF circuit to perform wireless communication with the set-top box.

16. A display apparatus, comprising:

a first antenna unit configured to perform wireless communication with an external device;

a first radio-frequency (RF) circuit configured to transmit and receive signals through the first antenna unit;

a second antenna unit configured to perform wireless communication with a set-top box;

a second RF circuit configured to transmit and receive signals through the second antenna unit;

a third switch configured to selectively connect the second antenna unit to the first RF circuit and to the second RF circuit;

a memory storing instructions; and at least one processor configured to execute the instructions to:

identify a quality of signals received through the first antenna unit, and based on the second RF circuit being in a standby state and the quality of signals received through the first antenna unit being less than or equal to a second reference value, control the third switch to connect the second antenna unit to the first RF circuit to perform wireless communication with the external device.

17. The display apparatus of claim 16, further comprising:

a second matching circuit between the third switch and the first RF circuit, the second matching circuit being configured to control an impedance of the second antenna unit to correspond with a frequency of signals received from the external device.

18. The display apparatus of claim 17, further comprising:

a fourth switch between the second matching circuit and the first RF circuit, the fourth switch being configured to selectively connect wiring from the second antenna unit to the first RF circuit, wherein the at least one processor is further configured to execute the instructions to:

based on the second antenna unit being connected to the second RF circuit, control the fourth switch to disconnect the wiring from the second antenna unit to the first RF circuit.

19. The display apparatus of claim 16, further comprising:

an interface configured to receive a user input for performing wireless communication with the external device, wherein the at least one processor is further configured to execute the instructions to:

based on the quality of signals received through the first antenna unit being less than or equal to the second reference value and the user input being received through the interface, convert the second RF circuit to the standby state, and control the third switch to connect the second antenna unit to the first RF circuit to perform wireless communication with the external device.

* * * * *